(12) United States Patent
Donkervoet (10) Patent No.: US 11,120,488 B2
(45) Date of Patent: Sep. 14, 2021

(54) SYSTEM AND METHOD FOR AUTOMATED NETWORK TRADING PLATFORM

(71) Applicant: Renegade Logic, LLC, Dallas, TX (US)

(72) Inventor: Alex G. Donkervoet, Dallas, TX (US)

(73) Assignee: Renegade Logic, LLC, Dallas, TX (US)

( * ) Notice: Subject to any disclaimer, the term of this patent is extended or adjusted under 35 U.S.C. 154(b) by 576 days.

(21) Appl. No.: 15/875,951

(22) Filed: Jan. 19, 2018

(65) Prior Publication Data

US 2018/0204262 A1  Jul. 19, 2018

Related U.S. Application Data (60) Provisional application No. 62/448,210, filed on Jan. 19, 2017.

(51) Int. Cl.
| | | |
|---|---|---|
| *G06Q 30/00* | (2012.01) | |
| *G06Q 30/06* | (2012.01) | |
| G06F 16/28 | (2019.01) | |
| G06F 16/2457 | (2019.01) | |

(52) U.S. Cl.
CPC ..... *G06Q 30/0613* (2013.01); *G06Q 30/0611* (2013.01); *G06Q 30/0623* (2013.01); *G06Q 30/0641* (2013.01); *G06F 16/24573* (2019.01); *G06F 16/284* (2019.01)

(58) Field of Classification Search
CPC .......... G06Q 30/0623; G06Q 30/0641; G06Q 30/0613; G06Q 30/0611; G06F 16/24573; G06F 16/284

USPC ..................................................... 705/26, 27
See application file for complete search history.

(56) References Cited

U.S. PATENT DOCUMENTS

| | | |
|---|---|---|
| 6,847,938 B1 * | 1/2005 | Moore ............... G06Q 30/0613 705/26.41 |
| 7,158,956 B1 | 1/2007 | Himmelstein |
| 7,877,315 B2 | 1/2011 | Pickering |
| 7,911,346 B1 * | 3/2011 | Claudatos .............. G06Q 20/12 340/572.4 |
| 7,925,541 B2 | 4/2011 | Bocheck |
| 8,190,491 B2 | 5/2012 | Greaves et al. |
| 8,515,814 B2 | 8/2013 | Boutilier et al. |
| 8,645,203 B2 | 2/2014 | Bocheck |
| 8,751,325 B2 | 6/2014 | Pickering |

(Continued)

FOREIGN PATENT DOCUMENTS

WO        2010042100        4/2010

OTHER PUBLICATIONS

Bartering for Bargains Nash, Collin. Black Enterprise 22.2: 37. Earl G. Graves Publishing Company, Inc. (Sep. 1991), Dialog 00563398, 3pges. (Year: 1991).*

(Continued)

*Primary Examiner* — Robert M Pond
(74) *Attorney, Agent, or Firm* — Schultz & Associates, P.C.

(57) ABSTRACT

A system for trading items comprising a server and user machines connected by a network. The system receives item information and locates available items. The system receives trade relationships and generates trade circles. The system identifies an optimum trade circle solution and causes the exchange of items identified in the optimum trade circle solution.

3 Claims, 9 Drawing Sheets

(56) References Cited

U.S. PATENT DOCUMENTS

| | | | |
|---|---|---|---|
| 8,799,143 B1* | 8/2014 | Lane | G06Q 40/06 705/37 |
| 2002/0032668 A1* | 3/2002 | Kohler | G06Q 30/06 705/401 |
| 2003/0163392 A1 | 8/2003 | Banerjee et al. | |
| 2008/0147479 A1 | 6/2008 | Johnson | |
| 2009/0012875 A1 | 1/2009 | Zanini et al. | |
| 2009/0271284 A1 | 10/2009 | Arbib | |
| 2010/0161597 A1* | 6/2010 | Bocheck | G06Q 30/00 707/726 |
| 2010/0235288 A1 | 9/2010 | Kisbye | |
| 2010/0332342 A1 | 12/2010 | Degroot et al. | |
| 2011/0166949 A1 | 7/2011 | Nguyen et al. | |
| 2011/0196760 A1 | 8/2011 | Howard et al. | |
| 2012/0030068 A1 | 2/2012 | Thomas | |
| 2012/0238367 A1 | 9/2012 | Kido et al. | |
| 2012/0296808 A1 | 11/2012 | Rovellequartz | |
| 2013/0024309 A1 | 1/2013 | Sandholm | |
| 2013/0246255 A1* | 9/2013 | Pernice | G06Q 20/085 705/39 |
| 2014/0100991 A1 | 4/2014 | Lenahan et al. | |
| 2014/0279131 A1 | 9/2014 | Sullivan et al. | |
| 2014/0279616 A1* | 9/2014 | Aoki | G06Q 30/0282 705/319 |
| 2015/0058083 A1 | 2/2015 | Herrero | |
| 2015/0221006 A1 | 8/2015 | Sainaney et al. | |
| 2015/0242916 A1 | 8/2015 | Godsey | |
| 2015/0294399 A1* | 10/2015 | Spaulding | G06Q 30/0641 705/27.1 |
| 2016/0055563 A1 | 2/2016 | Grandhi | |
| 2016/0335269 A1 | 11/2016 | Wheeler et al. | |
| 2016/0350835 A1* | 12/2016 | Rittman | G06Q 30/0633 |

OTHER PUBLICATIONS

World's Largest Swap Site Goes Live; WebSwap.com Brings Favorite Pastime to the Internet; Swapping More Fun Than Auctions: Everyone Wins, No One Loses Business Wire Feb. 7, 2000: 1278, 2pgs, (Year: 2000).*

Web-bartering enters new era: [ALL Edition] Elizabeth Owuor Contributor to The Christian Science Monitor. The Christian Science Monitor [Boston, Mass] Jul. 27, 2006, Dialog # 405546657, 3pgs, (Year: 2006).*

Barter site connects haves with have nots Woodruff, Cosby. Montgomery Advertiser [Montgomery, Ala] Mar. 13, 2009, Dialog # 413684885, 2pgs. (Year: 2009).*

Item UU: Barter Web site aims to be 'eBay of swap' Goodison, Donna. McClatchy—Tribune Business News [Washington] Apr. 1, 2011, Dialog # 859465480, 2pgs. (Year: 2011).*

Adomavicius, Gediminas, Nikos Manouselis, and YoungOk Kwon. "Multicriteria recommender systems." Recommender systems handbook. Springer US, 2011. 769-803 http://ids.csom.umn.edu/faculty/gedas/NSFCareer/MCRSchapter2010.pdf.

"The App That Lets You Buy, Sell, Swap and Freecycle anything locally." Paperclip, paperclip.co, accessed: Dec. 2016. https://paperclip.co/.

"Bartering Tools & Resources." MoE, meansofexchange.com, accessed: Dec. 2016. http://www.meansofexchange.com/typesofexchange/bartering/communitytoolsbartering/.

Kaplan, Randy M. "An improved algorithm for multiway trading for exchange and barter." Electronic Commerce Research and Applications 10.1 (2011): 67-74. https://pdfs.semanticscholar.org/537e/664c009736c58cd8ab2332df35ffe454181d.pdf.

* cited by examiner

SYSTEM AND METHOD FOR AUTOMATED NETWORK TRADING PLATFORM

CROSS-REFERENCE TO RELATED APPLICATIONS

This application claims priority to U.S. Provisional Application No. 62/448,210 filed Jan. 19, 2017, which is incorporated herein by reference in its entirety to provide continuity of disclosure.

FIELD OF THE INVENTION

The field of the invention is online trading and bartering systems.

BACKGROUND

Trade and bartering systems allow for the exchange of goods or services without using a medium of exchange between the parties. Online trading sites and the platforms allow people to identify items that are being offered for trade and to identify items that are desired. These trading platforms then find solutions that match offered items to desired items so that the owners of the items may exchange the items. A problem with prior art systems and methods is that the trade solutions found for the groups of people are not maximized.

U.S. Publication No. 2011/0166949 to Nguyen, et al. discloses a system and method for conducting barter transactions between members of a service without using explicit prices or values assigned to the items. The method utilizes a one for one barter system supported by a matching algorithm that uses as inputs the members' 'have lists', defined as items owned available for barter, and 'want lists', defined as items desired. The system in Nguyen, et al. does not maximize the trade solution for a group of people.

U.S. Publication No. 2011/0196760 to Howard, et al. discloses a method for online trading of used or surplus items in which users can create a profile, submit items for trade, search a database of used and surplus items, and be automatically notified if an uploaded item matches the user's search request and is available for trade. However, Howard, et al. does not optimize trading solutions for groups of people.

U.S. Pat. No. 8,645,203 to Bocheck discloses a method and system for finding optimal matches between two or more items or offers. A search engine searches for possible trades between the parties and gives consideration to the weights of the links that represent degrees of similarity between available items and wanted items. However, the systems of Bocheck do not identify an optimal trading solution for groups of people.

SUMMARY OF THE INVENTION

A system comprising a server and user machines for trading items. The system receives item information and locates available items. The system receives trade relationships and generates trade circles. The system identifies a trade circle solution with the most trade circle items and causes the exchange of items identified in the trade circle solution.

BRIEF DESCRIPTION OF THE DRAWINGS

The disclosed embodiments will be described with reference to the accompanying drawings.

DETAILED DESCRIPTION

The system and methods described are implemented using digital computer systems. In one aspect of the present disclosure, the systems and methods are implemented on a digital computing device having a processor for executing the methods embodied within a set of program instructions. The program instructions form a computer program product and are stored in an electronic memory and in digital storage media connected to the digital computing device. The digital computing device has a user interface system including a display device and a keying device for interacting with a user.

Embodiments of the present invention and its advantages are best understood by referring to the Figures provided. Each of the devices that form the systems described include a processor and memory where the memory includes instructions that, when executed by the processor, cause the devices to perform the steps of the methods described.

In the description that follows, like parts are marked throughout the specification and figures with the same numerals, respectively. The present disclosure may be illustrated and described in any of a number of patentable classes or contexts including any new and useful process or machine or any new and significant improvement.

A software program is provided that facilitates bartering between users through a computer network. Each user posts descriptions and pictures of items to trade. Other users perform the same action to form an item pool of all the items available for exchange. The program assigns a unique code to each posted item. A user may offer any one or any combination of his posted items in exchange for another user's posted items. A user can offer the same item to multiple different users. A user can make multiple different offers for the same desired item. The program creates a trade relationship between the items in an offer. A user can rank the trade relationship on a desirability scale. A user may also retract a posted item or rescind a proposed trade offer.

The program provides a method that determines all possible combinations of trades between users within a group to form a trade circle. The method assesses all permutations of possible trade circles and selects a match solution that achieves the highest number of users in a trade circle or the highest average desirability rank among the possible trade matches.

The program notifies each user of involved in the optimal trade circle. Each user is then provided the contact information of the user from they are to receive their desired item and users to which they are to deliver their traded item.

Figure 1:
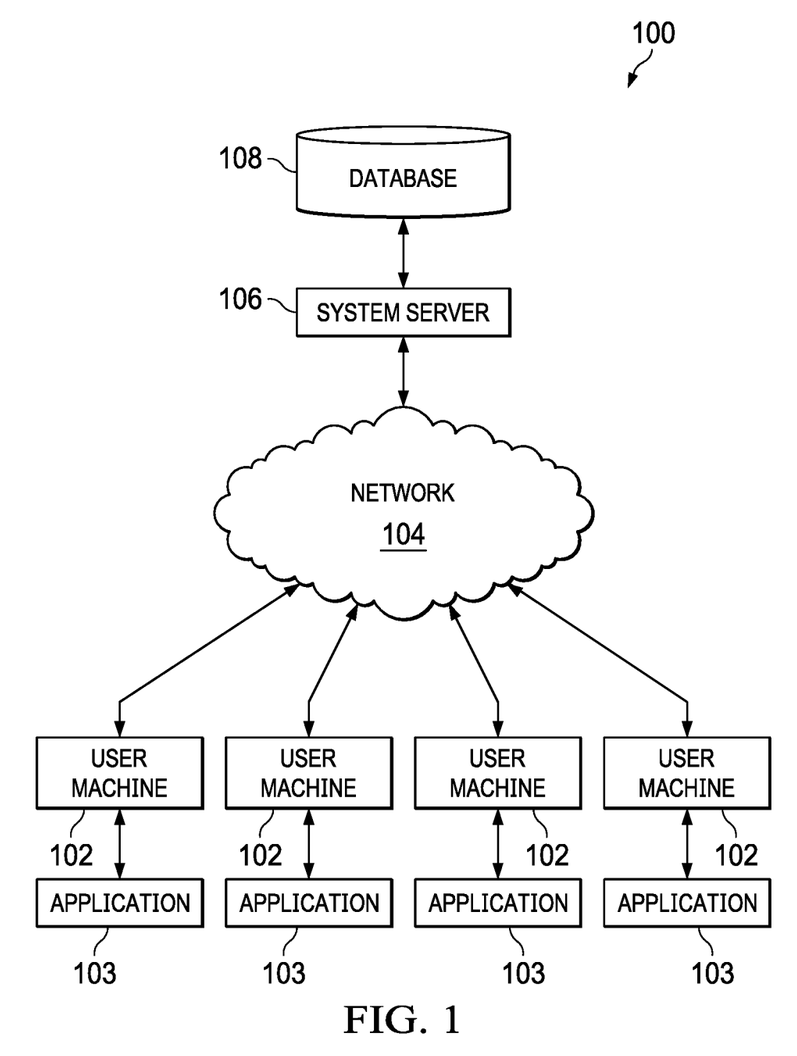
FIG. 1 is a network diagram of a system for trading items between users.

Referring to FIG. 1, system 100 includes user machines 102 connected to a wide area network 104, such as the Internet. Users interact with the server through applications 103, operating on each user machine 102. Server 106 and user machines 102 each include one or more processors and memory coupled together to store and execute instructions for one or more applications that implement the methods of system 100.

The system includes system server 106 connected to database 108 and wide area network 104. Wide area network 104 provides a communication channel between user machines 102 and system server 106 and database 108. System server 106 maintains communication between each of the user machines 102.

Each user machine 102 is a digital computing device. Each user machine 102 includes at least one processor and at least one memory. The memory stores instructions that are executed by the processor to run each instance of application 103. In a preferred embodiment, each user machine 102 is embodied as one of a smartphone, a tablet computer, and a desktop computer. In a preferred embodiment, applications 103 are embodied as one of an app for a smartphone or tablet, a webpage, and a desktop application.

Figure 2:
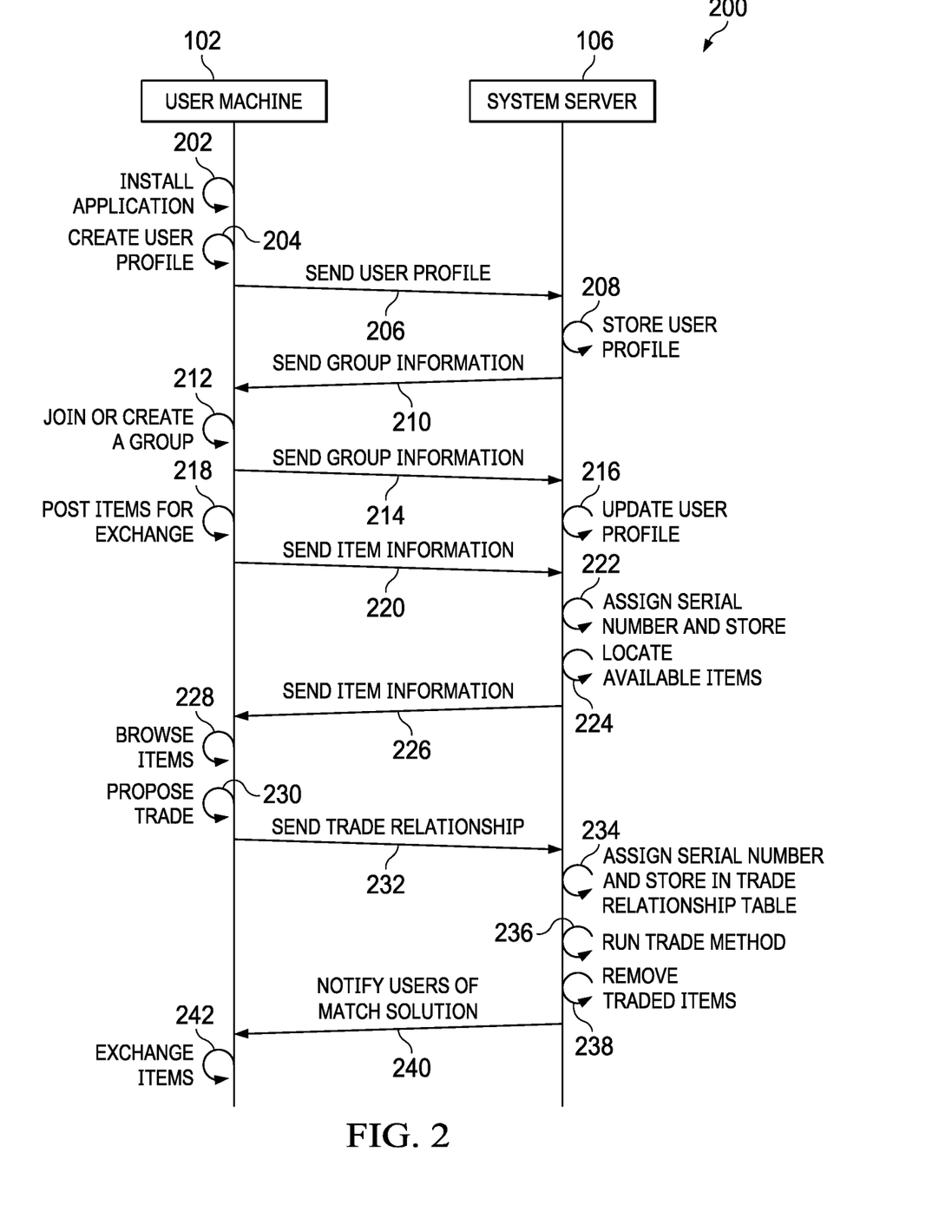
FIG. 2 is a sequence diagram of a method for trading items between users.

Referring to FIG. 2, method 200 for facilitating bartering is described.

At step 202, user machine 102 installs application 103. In a preferred embodiment, the application is downloaded from an app store such as the Google Play Store for Android devices or the iTunes App Store for Apple iOS devices.

At step 204, a user profile is created. Profile information includes name, address, email, phone number, and preferred contact method for the user of user machine 102.

At step 206, a user's profile information is transmitted to system server 106.

At step 208, system server 106 stores the user profile information and identifies, based on the user profile information, group information established from previously created user profiles.

At step 210, system server 106 sends the established group information. Groups can be a known collection of friends or family or may also be defined by a specific geographic boundary.

At step 212, a user joins a group or creates a new group. User machine 102 displays a user interface that allows for the creation of groups and for joining pre-existing groups.

At step 214, the group information is transmitted to system server 106. The group information is transmitted in response to the user of user machine 102 selecting one or more groups that are to be created or joined.

At step 216, system server 106 updates the user profile and group information. In a preferred embodiment, the database record that includes the user profile is updated to include the identifiers of the groups selected or created by the user.

At step 218, a user post items for exchange. Information needed to post an item include a title, a description, images of the item, and a pick up or ship stipulation. The information about each posted item is collected by user machine 102 using one or more inputs of using machine 102, such as a keyboard, a mouse, a touch-sensitive screen, a microphone, and a camera.

At step 220 the information about each posted item is transmitted to system server 106. The information is included within a message that is mapped to a set of instructions that are triggered on system server 106 upon receipt of the message.

At step 222, system server 106 assigns a unique serial number to each posted item and stores the information in the database. In a preferred environment, the unique serial number is a cryptographic hash of the information about the item, including the description of the item and the image of the item.

At step 224, posted items for all the groups a user is a member of is located creating an item pool. The item pool includes each combination of one or more items that are offered by other users of system 100.

At step 226, information regarding the item pool is transmitted to the user. In a preferred embodiment, the information is limited to items from other users that are in one or more of the same groups as the user of user machine 102.

At step 228, posted items and combinations are browsed. In one embodiment, a user can only browse posted items from other users that belong to the same group or groups as the user.

At step 230, a user proposes a trade. The user identifies a desired item from the items in the item pool offered by another user. The user of user machine 102 offers up one or any combination of the user's posted items in exchange for the identified desired item. The combination of the "offered" item and the "desired" item create a trade relationship. Each trade relationship is unique and is a one-way offer of a user's item in exchange for another's user's item. In one embodiment, a user can offer a combination of items for a single item or a combination of items of another user. In another embodiment, the user can rank each trade relationship on a desirability scale.

At step 232, the trade relationship is transmitted to system server 106. The trade relationship is included in a message that, upon receipt by system server 106, triggers the execution of a set of instructions.

At step 234, system server 106 assigns a unique serial number to each trade relationship and stores all trade relationships in a trade relationship table.

An example of a trade relationship table is as follows:

| Offered Item | | Desired Item |
| --- | --- | --- |
| A | ⟶ | B |
| A | ⟶ | C |
| B | ⟶ | D |
| D | ⟶ | C |

At step 236, the trade method is executed. The method assesses all the trade relationships within the group and arrives at a trade circle match solution, as will be further described.

At step 238, system server 106 removes all items involved in a successful trade circle from the item pool and removes any trade relationships that include those items from the trade relationship table.

At step 240, system server 106 notifies all users involved in the trade circle match solution. System server 106 sends the contact information of who the user is required to deliver their posted item to and the contact information of who is required to deliver the desired item to the user.

At step 242 the users facilitate physical exchange of items.

In a preferred embodiment, system 100 includes an electronic locker system that stores the items to be traded between the users of system 100. After a trade circle solution is found, each user in the trade circle solution is assigned a locker of the electronic locker system and places the correct offered items within the assigned lockers. After all of the offered items have been placed into respectively assigned lockers, the unlock codes for each of the lockers is changed. System 100 then identifies the locker location and of the desired item for each user and provides this information to the users.

Figure 3A:
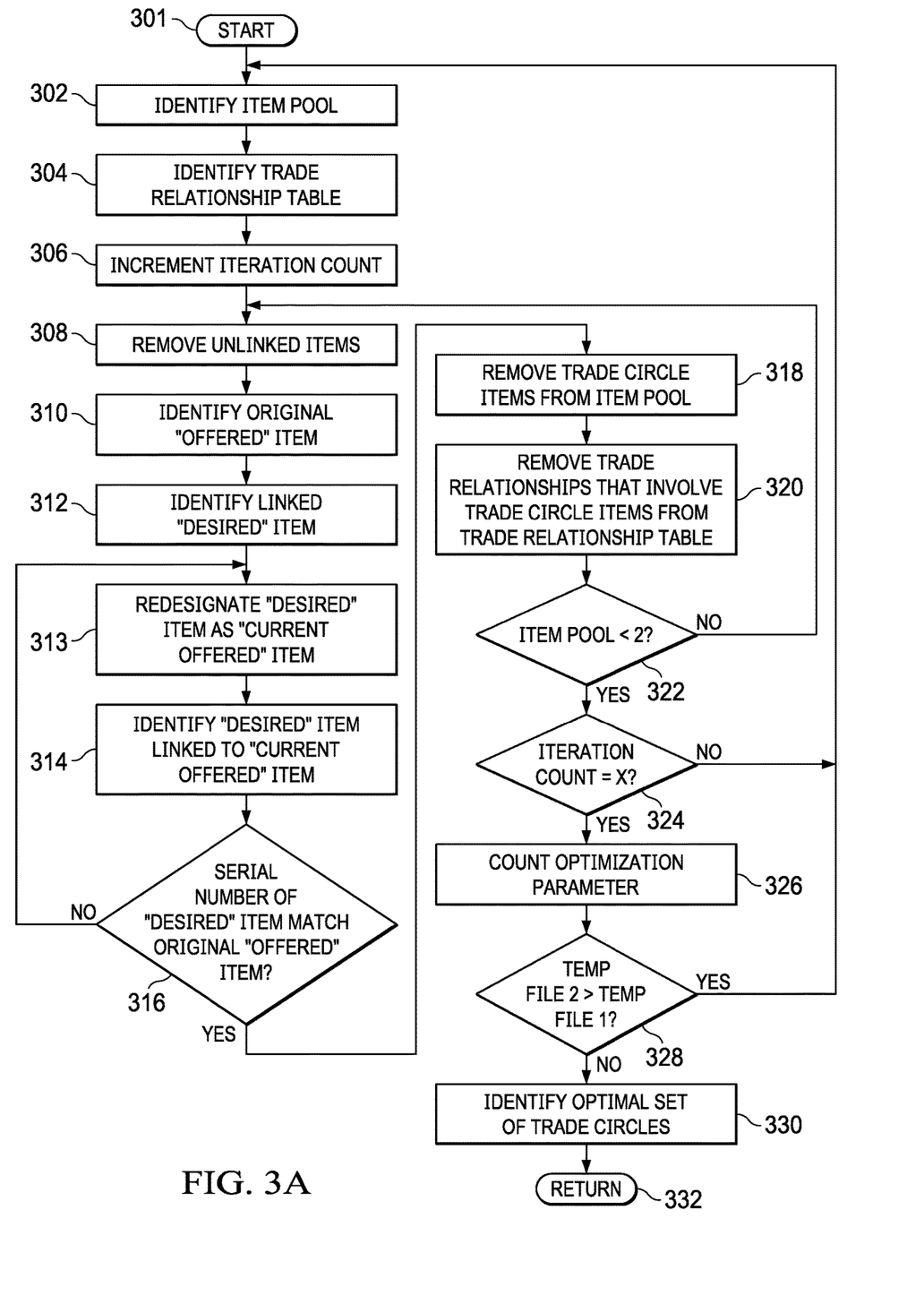
FIGS. 3A and 3B are flowcharts detailing methods for trading items between users.

Referring to FIG. 3A, a flowchart of the preferred steps of method 300 is shown. At step 301, the method starts.

At step 302, an item pool is identified for a group. Each item in the item pool has a unique serial number and is identified as being "offered" or "desired" by the users of system 100.

At step 304, a trade relationship table for a group of users is identified. Each trade relationship in the trade relationship table has a unique serial number. In a preferred embodiment, the unique serial number of a trade relationship includes a cryptographic hash of the serial numbers of the items in the trade relationship.

At step 306, an iteration count is incremented by one. The iteration count tracks the number of times that a trade circle solution has been identified for the current item pool. The iteration count is used to ensure that a minimum predetermined number of iterations have been processed, so as to increase the number of items traded.

At step 308, any unlinked items in the item pool are removed from the item pool, as will be further described. Unlinked items are any of the items in the item pool that have not been identified in a trade relationship as both an "offered" item and a "desired" item. Any trade relationships involving unlinked items are removed from the trade relationship table.

At step 310, an original "offered" item is chosen at random.

At step 312, a "desired" item linked to the original "offered" item in a trade relationship is identified from the trade relationship table.

At step 313, the "desired" item is redesignated as the "current offered" item.

At step 314, the "current offered" item is then located in the "offered" column of the trade relationship table and the "desired" item linked to it is identified.

At step 316, the serial number of the "desired" item is compared to the serial number of the original "offered" item. If the serial numbers match, a trade circle is complete, and the method moves to step 318. If the serial numbers do not match, the method returns to step 313.

At step 318, all the items involved in the completed trade circle are removed from the item pool and stored in a temporary file.

At step 320, any trade relationships that involve the completed trade circle items are removed from the trade relationship table.

At step 322, if more than one item still exists in the item pool, then the method returns to step 308 to identify additional items to be part of the trade circle solution.

At step 324, the iteration count is compared to a predetermined number. If the predetermined number has been reached, then the method moves to step 326. If not, the method returns to step 302.

At step 326, a count of an optimization parameter is made. The optimization parameter can include the number of completed trade circle items, the number of items in the trade solution, the sum of the desirability rank of all traded items or the number of users in the trade solution.

At step 328, the count of the optimization parameter in the temporary file is compared to the previous count of the optimization parameter in the previous temporary file. If the current number is greater than the previous number, then the method returns to step 302 to restart in an attempt to find a more optimal solution. If the current number is less than the previous number or equal to it, then the method moves to step 330. In one embodiment, the method completes a fixed number of iterations without comparing the temporary files.

At step 330, the optimal set of completed trade circles is identified as a selected trade circle solution.

At step 332, the method returns.

Figure 3B:
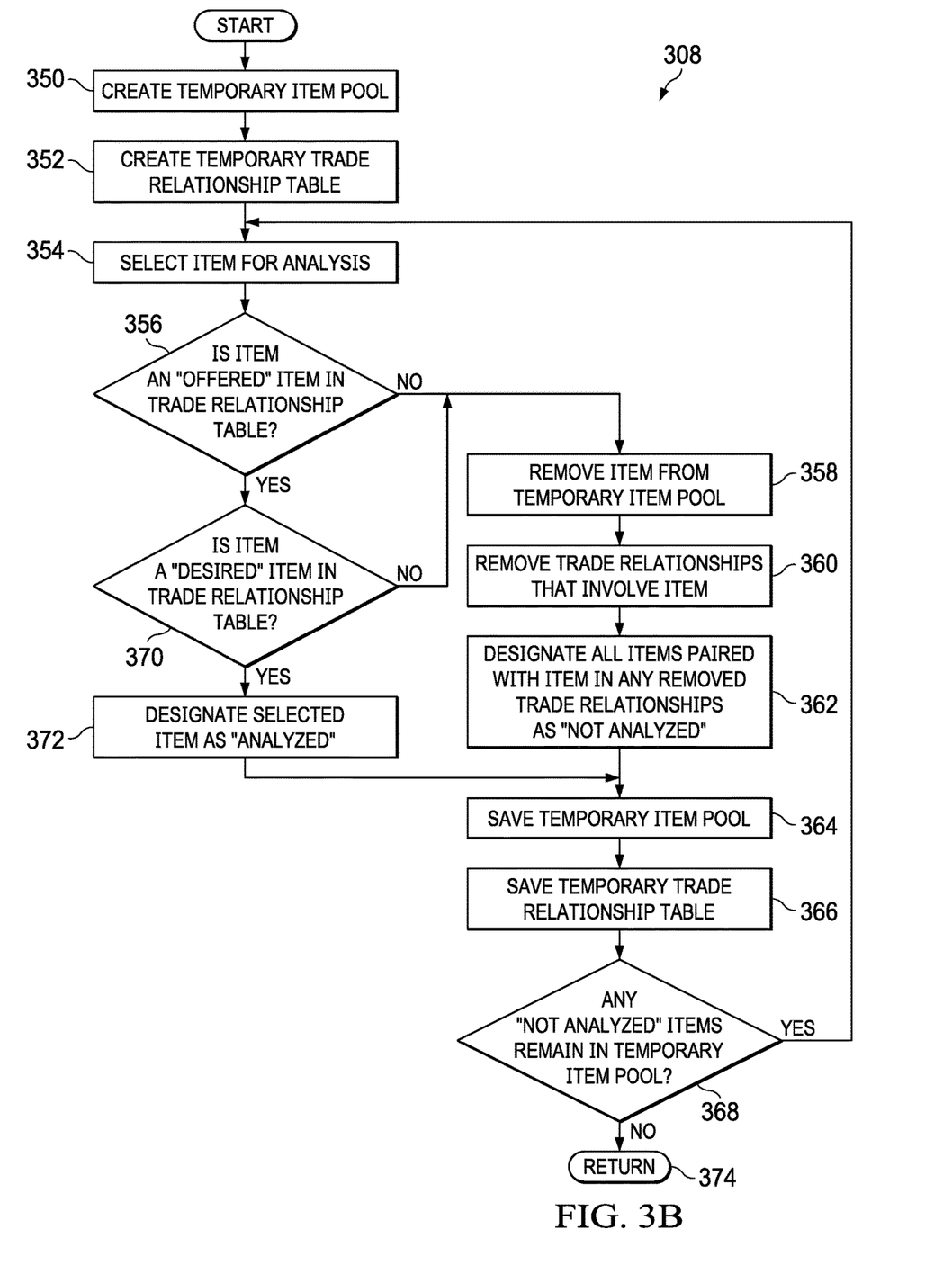

Referring to FIG. 3B, a flowchart of step 308 for removing any unlinked items from the item pool is described.

At step 350, all items in the item pool are saved to a temporary item pool and each is designated as "Not Analyzed."

At step 352, all trade relationships in the trade relationship table are saved to a temporary trade relationship table.

At step 354, an item designated as "Not Analyzed" in the temporary item pool is selected for analysis. In a preferred embodiment, the items designated as "Not Analyzed" are processed in the order of the serial numbers associated with the items.

At step 356, if the selected item is an "offered" item in the temporary trade relationship table, then the method proceeds to step 370. If not, then the method proceeds to step 358.

At step 358, the selected item is removed from the temporary item pool. The item is removed because it is not identified as being both an "offered" item and a "desired" item in the trade relationship table.

At step 360, any trade relationships that include the selected item as an "offered" item or as a "desired" item are removed from the trade relationship table.

At step 362, all items linked with the selected item in any removed trade relationship are designated as "Not Analyzed".

At step 364, the temporary item pool is saved.

At step 366, the temporary trade relationship table is saved.

At step 368, if any "Not Analyzed" items remain in the temporary item pool, then the method returns to step 354 to process the other items that have not been analyzed. If not, the method proceeds to step 374.

At step 374, the method returns.

At step 370, it is determined whether or not the current item is identified as a "desired" item in the trade relationship table. If the selected item is a "desired" item in the trade relationship table, then the method proceeds to step 372. If not, the method proceeds to step 358.

At step 372, the selected item is designated as "Analyzed," and the method proceeds to step 364.

Figure 4:
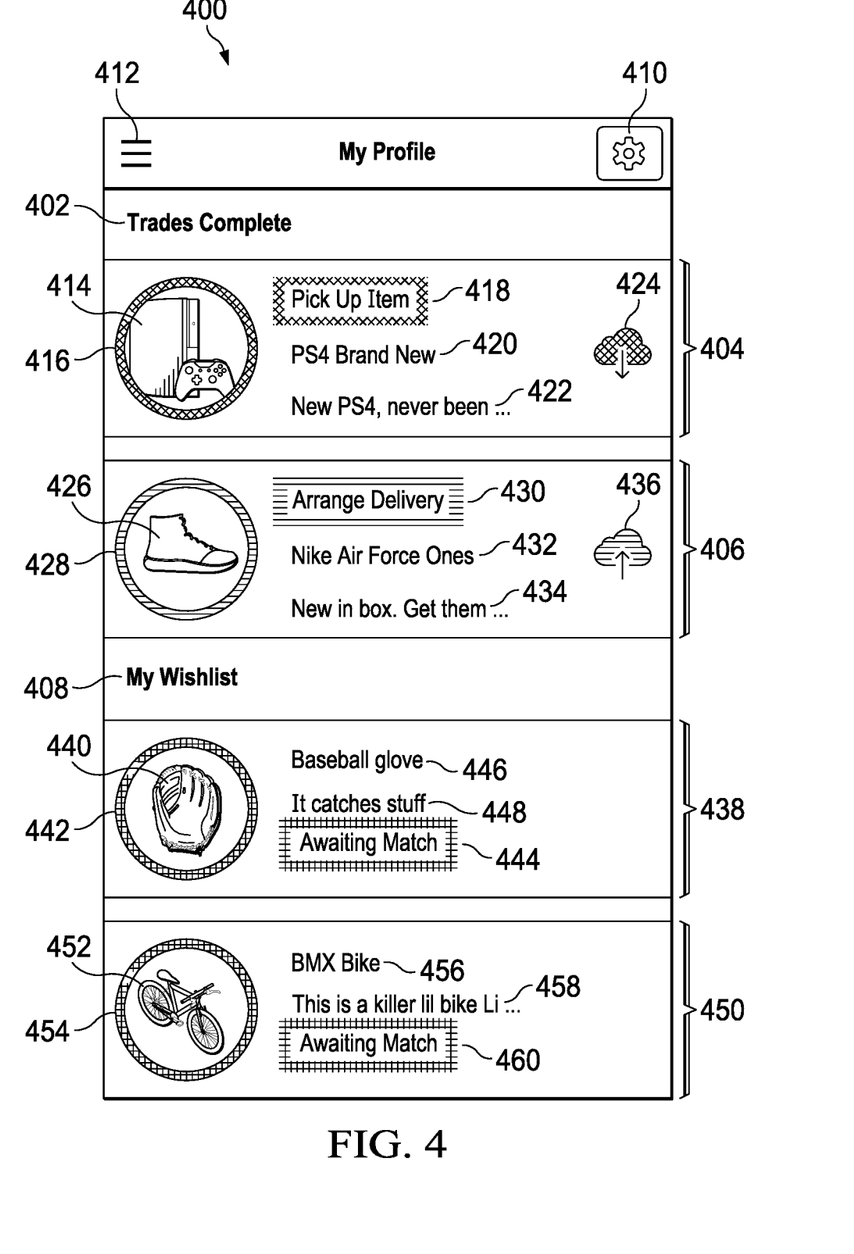
FIG. 4 is a preferred embodiment of a graphic user interface for the system for trading items.

Referring to FIG. 4, screen 400 is a user interface displayed on user machine 102 that is used to organize items and trades of a user. Screen 400 lists completed trades in section 402. Items to be received as well as items to be delivered are listed in section 402. Pending trade relationships appear under section 408. Settings button 410 allows the user to update profile information such as name, address, and contact information. List indicator button 412 displays a pulldown list of program options.

Set 404 of graphical user interface elements is shown in section 402. Set 404 is associated with an item that is to be received. Set 404 includes user interface elements for image 414, image border 416, status 418, short description 420, long description 422, and icon 424, which are each associated with the item to be received. Image 414 provides a relevant picture of the item to be received. Image border 416 surrounds image 414. Status 418 indicates the status of the trade, and here indicates that the item to be received is ready to be picked up. Status 418 is positioned above short description 420 and long description 422, which indicates that additional work is required by the user for the item of set 404. Short description 420 provides a short textual description of the item. Long description 422 provides more details about the item, including the condition and quality of the item. Icon 424 provides a graphical indication and image of the status of the item related to set 404. In a preferred embodiment, the colors of image border 416, status 418, and icon 424 are each the same status color (orange) that identifies the status of the item of set 404 as ready to be received.

Set 406 of graphical user interface elements is shown in section 402 and is associated with an item that is to be delivered. Set 406 includes user interface elements, which are similar to those of set 404, for image 426, image border 428, status 430, short description 432, long description 434, and icon 436 that are each associated with the item to be delivered. In a preferred embodiment, the colors of image border 416, status 418, and icon 424 are each the same status color (blue), which is different from the status color of set 404. The status color of set 406 identifies the item of set 406 as ready to be delivered.

Section 408 includes the display of item using sets 438 and 450 of graphical user interface elements. In a preferred embodiment, the items displayed with sets 438 and 450 are items that have been offered by one or more other users of the system, that are wanted by the user of user machine 102, and that have not yet been paired with an item or combination of items of the user.

Sets 438 and 450 respectively include user interface elements for images 440 and 452, image border 442 and 454, short descriptions 446 and 456, and long description 448 and 458, and status elements 444 and 460, which each operate similar to the graphical user interface elements of sets 404 and 406. Status elements 444 and 460 are positioned below their respective short descriptions and long description to indicate that user action is not required for the items of sets 438 and 450. In a preferred embodiment, the colors of image borders 442 and 454 and of status elements 444 and 418 are each the same status color (yellow) to identify that the status of the items of sets 438 and 450 are the same. In a preferred embodiment, the status colors of orange, blue, and yellow identify items that have the same or different status.

Figure 5:
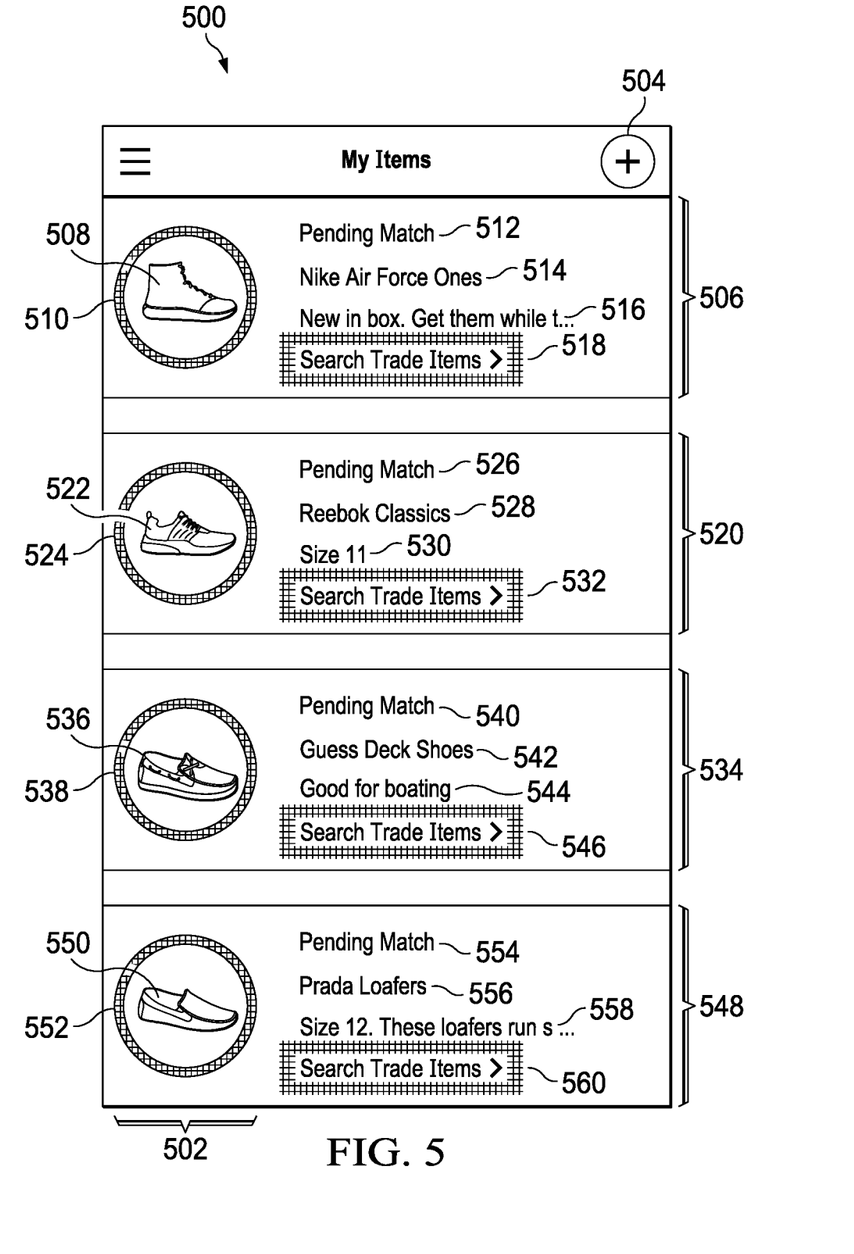
FIG. 5 is a preferred embodiment of a graphic user interface for the system for trading items.

Referring to FIG. 5, screen 500 is shown. Item list 502 displays each item the user has posted as available for trade. Clicking an item from item list 502 displays a picture of the item and a description. Additional exchange items can be posted by clicking plus button 504.

Sets 506, 520, 534, and 548 of graphical user interface elements in item list 502 are each associated with a respective item that has been identified as an offered item by the user of user machine 102. Each of sets 506, 520, 534, and 548 respectively includes an image (508, 522, 536, and 550), an image border (510, 524, 538, and 552), a status (512, 526, 540, and 554), a short description (514, 528, 542, and 556), a long description (516, 530, 544, and 558), and a search link (518, 532, 546, and 560). In a preferred embodiment, screen 500 has the search links (518, 532, 546, and 560) displayed with the status color (yellow) instead of having each status (512, 526, 540, and 554) being displayed with the status color (yellow).

Figure 8:
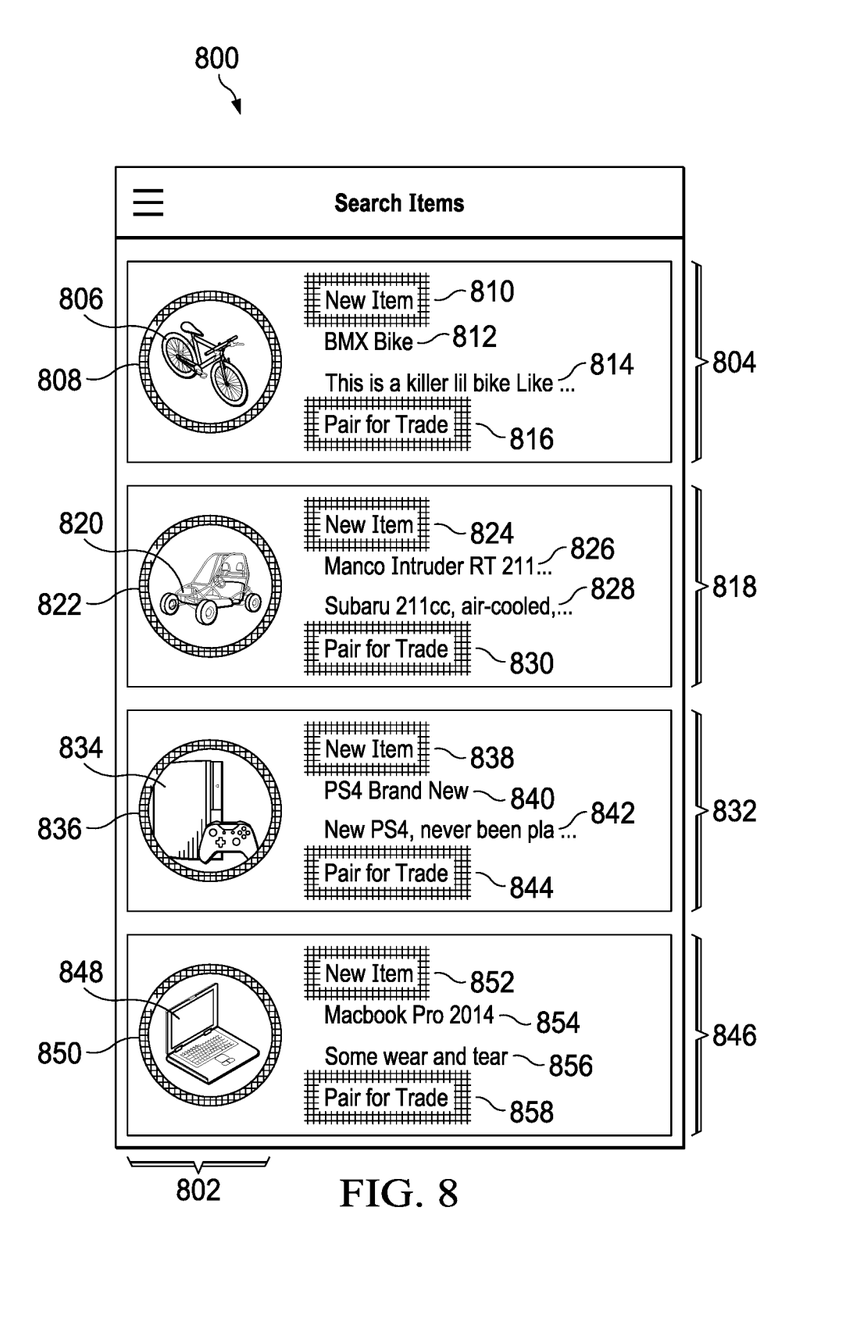
FIG. 8 is a preferred embodiment of a graphic user interface for the system for trading items.

In a preferred embodiment, selection of a search link transitions to screen 800 of FIG. 8 to allow the user to identify an item as a desired item. In a preferred embodiment, selecting search link 532 triggers the display of screen 800. Subsequent selection of, e.g., pair link 816 from screen 800 causes user machine 102 to pair the item of set 520 with the item of set 804 and create an entry in a trade relationship table that identifies the item of set 520 as an offered item and the item of set 804 as a desired item.

Figure 6:
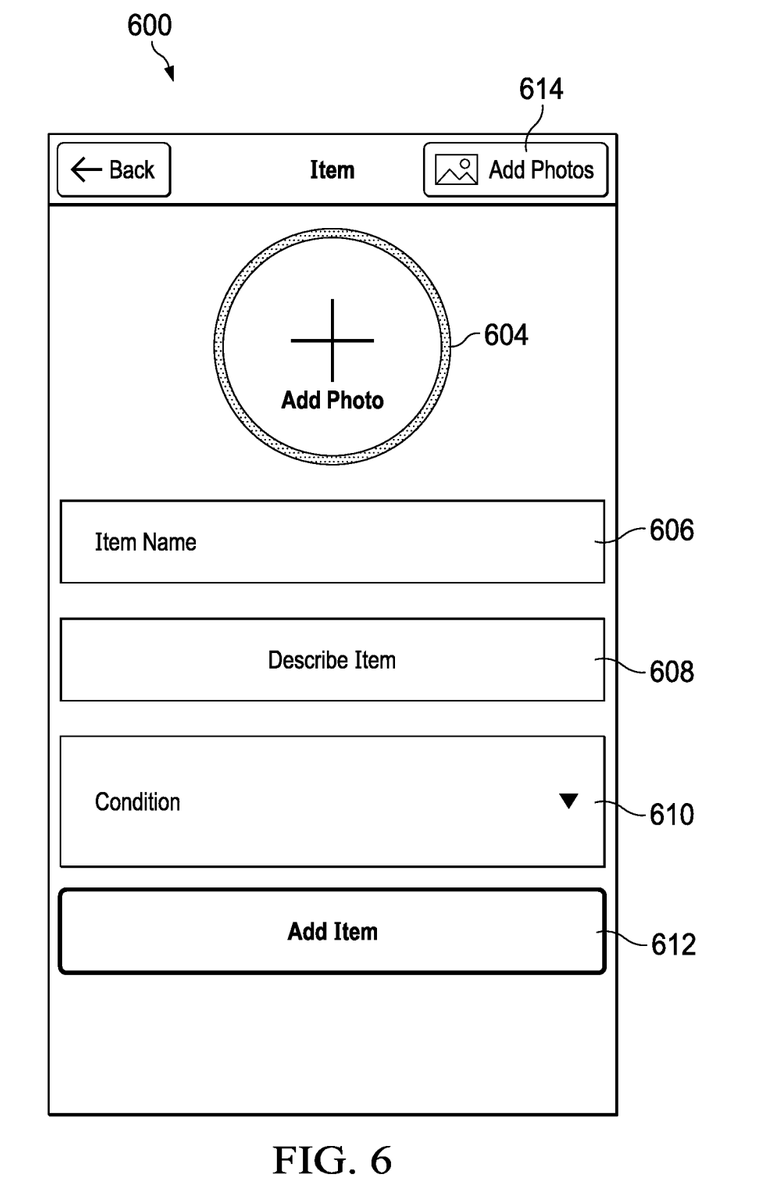
FIG. 6 is a preferred embodiment of a graphic user interface for the system for trading items.

Referring to FIG. 6, button 504 provides item screen 600. Screen 600 includes add photo button 604 to attach an image of a posted item. In text entry field 606, the user can name the item. In text entry field 608, the user can describe the item. Condition button 610 displays a list of conditions for the item as "poor," "good," or "excellent." Add item button 612 adds the item to the list of my items.

Selection of add photo button 604 brings up a camera application to take a live photo of an item. Additionally, selection of photos button 614 brings up a photo storage application from which the user can select and image that has already been stored on user machine 102.

Figure 7:
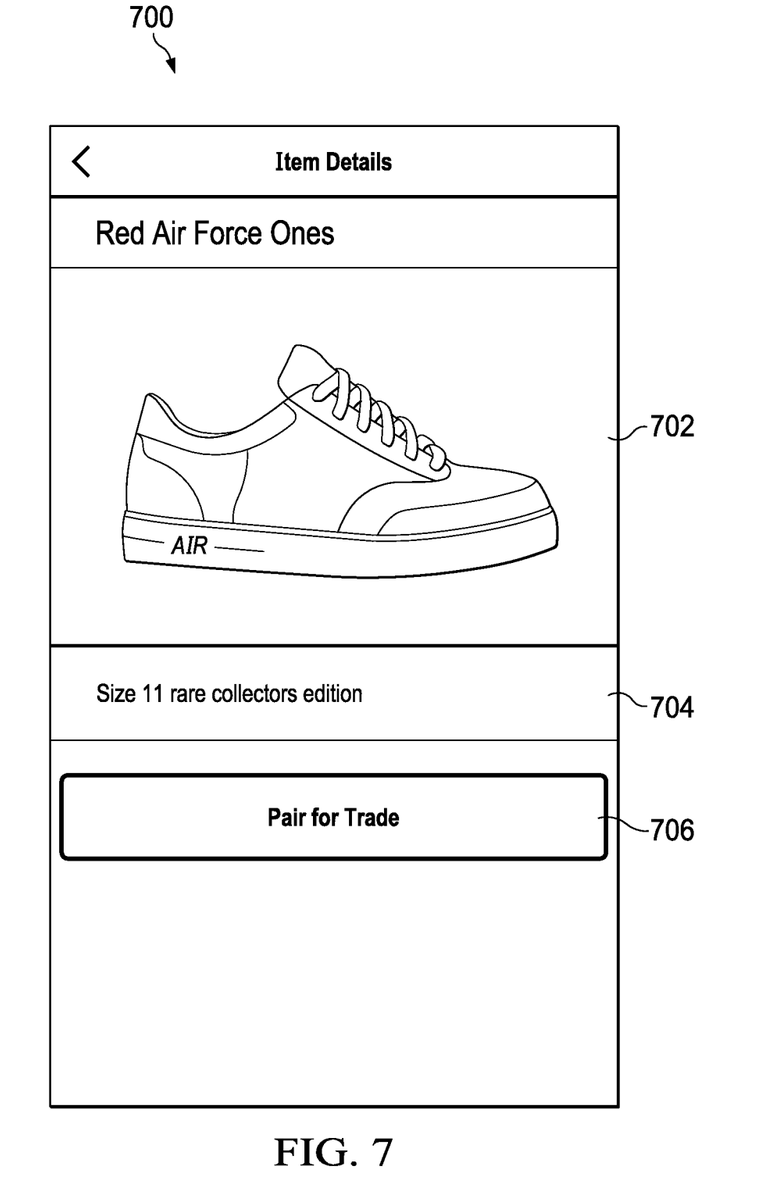
FIG. 7 is a preferred embodiment of a graphic user interface for the system for trading items.

Referring to FIG. 7, selecting an item from list 802 pulls up item details screen 700 for the selected item from screen 800. Area 702 displays the selected item and area 704 describes the selected item. Pair for Trade button 706 pulls up a list of my items seen in item screen 600 when an item from the list of my items from screen 600 has not already been selected. Selecting any one of the items from screen 600 that the user has posted creates a trade relationship that includes the item selected from screen 800, which is displayed on screen 700, and the item selected from screen 600.

As shown in FIG. 8, screen 800 can be accessed from any screen. Item list 802 displays every item that other users have posted as available for trade. In one embodiment, only items offered by other users that belong to the same group will be displayed. Each item from item list 802 displays a detailed screen for that item and includes a description. From the detailed screen of the selected item, a list of the user's items can be seen and offered in a trade for the item selected from screen 800.

Sets 804, 818, 832, and 846 of graphical user interface elements in item list 802 are each associated with a respective item that has been identified as an offered item by other users system 100. Each of sets 804, 818, 832, and 846 respectively includes an image (806, 820, 834, and 848), an image border (808, 822, 836, and 850), a status (810, 824, 838, and 852), a short description (812, 826, 840, and 854), a long description (814, 828, 842, and 856), and a pair link (816, 830, 844, and 858). In a preferred embodiment, screen 800 has the pair links (816, 830, 844, and 858) and each status (810, 824, 838, and 852) displayed with the status color (yellow).

In a preferred embodiment, selection of a pair link (816, 830, 844, and 858) causes a transitions to screen 700 of FIG. 7 to allow the user to review the item, which is being offered by another user. Subsequent selection of button 706 causes user machine 102 to either pair the item selected from screen 800 with an item previously selected from screen 500, or to identify the item from screen 800 as a currently selected item and transition to screen 500 to allow the user to select an item to offer for pairing.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:
1. A system for trading a plurality of items, the system comprising a set of at least two user machines connected to a server, the server having a memory and a processor, the memory including instructions that cause the processor to perform the steps of:
    receiving a classification of a first item of the plurality of items as "offered" from a first user machine of the set of user machines;
    receiving a first trade proposal from the first user machine which includes the first item;
    receiving a classification of a second item of the plurality of items as "desired" from a second user machine of the set of user machines as part of a second trade proposal, wherein the second item is classified as "offered" by a user machine of the set of user machines other than the second user machine;
    determining a trade relationship table with a set of trade proposals including a linkage between the first item and the second item based on the classification of the first item and the classification of the second item and the first trade proposal and the second trade proposal;
    generating a first trade circle including the first item and the second item;
    identifying the first trade circle as a trade circle solution;
    iteratively maximizing, at the server, a number of traded items of the plurality of items;
    removing the first item and the second item from the trade relationship table;
    sending a notification that identifies the trade circle solution;
    receiving a user profile;
    storing the user profile in the memory;
    retrieving group information, comprising a set of pre-existing groups, based upon the user profile;
    sending the group information to the first user machine;
    receiving selected group information from the first user machine, the selected group information identifying one or more of the group of the set of pre-existing groups and a set of new groups;
    assigning a trade serial number to the first trade proposal;
    cryptographically hashing, at the server, the trade serial number to create a hashed trade serial number;
    storing, at the server, the hashed trade serial number;
    wherein the step of generating a first trade circle further comprises:
        identifying an item pool that includes at least the first item and the second item;
        identifying an original offered item within the item pool;
        identifying a first desired item, within the item pool linked to the original offered item;
        redesignating the first desired item as a "current offered" item;
        identifying a second desired item linked to the "current offered" item;
        repeating the steps of redesignating the desired item and identifying the second desired item until the second desired item matches the original offered item;
        removing the original offered item, the first desired item and the second desired item from the item pool;
        removing each trade proposal from the trade relationship table that includes the original offered item, the first desired item and the second desired item; and,
        iteratively optimizing an optimization parameter.

2. A computer implemented method of a system for trading a plurality of items using a server and a set of at least two user machines connected to the server, the method comprising:
    receiving a classification of a first item of the plurality of items as "offered" from a first user machine of the set of user machines;
    receiving a first trade proposal from the first user machine which includes the first item;
    receiving a classification of a second item of the plurality of items as "desired" from a second user machine of the set of user machines as part of a second trade proposal, wherein the second item is classified as "offered" by a user machine of the set of user machines other than the second user machine;
    determining a trade relationship table with a set of trade proposals including a linkage between the first item and the second item based on the classification of the first item and the classification of the second item and the first trade proposal and the second trade proposal;
    generating a first trade circle including the first item and the second item;
    identifying the first trade circle as a trade circle solution;
    iteratively maximizing, at the server, a number of traded items of the plurality of items;
    removing the first item and the second item from the trade relationship table;
    sending a notification that identifies the trade circle solution;
    receiving a user profile;
    storing the user profile in a memory of the server;
    retrieving group information, comprising a set of pre-existing groups, based upon the user profile;
    sending the group information to the first user machine;
    receiving selected group information from the first user machine, the selected group information identifying one or more of the group of the set of pre-existing groups and a set of new groups;
    assigning a trade serial number to the first trade proposal;
    cryptographically hashing, at the server, the trade serial number, to create a hashed trade serial number;
    storing, at the server, the hashed trade serial number;
    wherein the step of generating a first trade circle further comprises:
        identifying an item pool that includes at least the first item and the second item;
        identifying an original offered item within the item pool;
        identifying a first desired item, within the item pool linked to the original offered item;
        redesignating the first desired item as a "current offered" item;
        identifying a second desired item linked to the "current offered" item;
        repeating the steps of redesignating the desired item and identifying the second desired item until the second desired item matches the original offered item;
        removing the original offered item, the first desired item and the second desired item from the item pool;
        removing each trade proposal from the trade relationship table that includes the original offered item, the first desired item and the second desired item; and,
        iteratively optimizing an optimization parameter.

3. A non-transitory computer-readable medium comprising instructions for trading a plurality of items using a server and a set of at least two user machines that, when executed by a processing device of the server, cause the processing device to perform operations comprising:

receiving a classification of a first item of the plurality of items as "offered" from a first user machine of the set of user machines;
receiving a first trade proposal from the first user machine which includes the first item;
receiving a classification of a second item of the plurality of items as "desired" from a second user machine of the set of user machines as part of a second trade proposal, wherein the second item is classified as "offered" by a user machine of the set of user machines other than the second user machine;
determining a trade relationship table with a set of trade proposals including a linkage between the first item and the second item based on the classification of the first item and the classification of the second item and the first trade proposal and the second trade proposal;
generating a first trade circle including the first item and the second item;
identifying the first trade circle as a trade circle solution;
iteratively maximizing, at the server, a number of traded items of the plurality of items;
removing the first item and the second item from the trade relationship table;
sending a notification that identifies the trade circle solution;
receiving a user profile;
storing the user profile in a memory of the server;
retrieving group information, comprising a set of pre-existing groups, based upon the user profile;
sending the group information to the first user machine;
receiving selected group information from the first user machine, the selected group information identifying one or more of the group of the set of pre-existing groups and a set of new groups;
assigning a trade serial number to the first trade proposal;
cryptographically hashing, at the server, the trade serial number to create a hashed trade serial number;
storing, at the server, the hashed trade serial number;
wherein the step of generating a first trade circle further comprises:
  identifying an item pool that includes at least the first item and the second item;
  identifying an original offered item within the item pool;
  identifying a first desired item, within the item pool linked to the original offered item;
  redesignating the first desired item as a "current offered" item;
  identifying a second desired item linked to the "current offered" item;
  repeating the steps of redesignating the desired item and identifying the second desired item until the second desired item matches the original offered item;
  removing the original offered item, the first desired item and the second desired item from the item pool;
  removing each trade proposal from the trade relationship table that includes the original offered item, the first desired item and the second desired item; and,
  iteratively optimizing an optimization parameter.

* * * * *